United States Patent Office 3,376,277
Patented Apr. 2, 1968

3,376,277
ANTISTATIC MOLDING COMPOSITION
Friedrich Seifert, Fritz Baxmann, and Dieter Carla, Marl, Germany, assignors to Chemische Werke Huls Aktiengesellschaft, Marl, Germany, a corporation of Germany
No Drawing. Filed June 29, 1964, Ser. No. 379,024
Claims priority, application Germany, Jan. 30, 1964, C 32,005
1 Claim. (Cl. 260—85.5)

ABSTRACT OF THE DISCLOSURE

This invention concerns antistatic agents for styrene polymers and copolymers. The antistatic agents are admixed with and incorporated into the polymers prior to molding. The antistatic agents are alkyl sulfonates wherein the alkyl groups have an average chain length of 15 carbon atoms.

---

It is known that polystyrene molding compositions can be rendered antistatic by dipping or spraying them in or with aqueous solutions of alkyl- or alkylaryl sulfonates (see Boundy-Boyer, "Styrene," 1952, page 551). Such a treatment has the disadvantage that the molding composition remains antistatic for only a short time because the coating so applied is not water proof. Moreover molding compositions so treated have a greasy-sticky feel.

It is also known that emulsion polymers of styrene which contain only the small amounts of alkyl- or alkylaryl sulfonates used as emulsifying agents in their preparation generally are dull and have poor electrical properties (see Ohlinger, "Polystyrol," page 94, paragraph 3, and page 98, paragraph 1 (1955)).

In order to avoid these disadvantages it has been proposed to make antistatic polystyrene by treating its surface with sulfuric acid (U.S. Patent No. 2,400,720) or to polymerize the styrene in the presence of styrene-sulfonic acid salts (U.S. Patent No. 2,971,947) or to mix the polystyrene with polystyrene sulfonate (U.S. Patent No. 2,707,709). Such expedients result in extensive undesirable alterations of the polystyrene which are reflected in its impaired mechanical properties. Amine salts of the esters of sulfuric acid with higher alcohols have been used but the resulting molding compositions have the named disadvantages (U.S. Patent No. 2,540,981).

It has now been found that antistatic molding compositions of polystyrene or styrene graft or copolymerizates are obtained if the polymer is mixed with from 2 to 6% by weight of an alkyl- or alkylbenzenesulfonate.

It has been found further that the sulfonate must be used in different proportions depending upon the method of working up the molding composition. If the molding composition is subjected to injection or extrusion molding it is necessary to add from 2 to 4% and preferably from 2.3 to 3.5% by weight of the sulfonate since at higher percentages stratification occurs or the molding composition becomes non-extrudable. If however the molding composition is to be press molded it is necessary to use 3–6% and preferably 4–5% by weight of the sulfonate since with smaller amounts no antistatic effect is obtained. With additions greater than 4% by weight the resulting press plates do not show any stratification.

Suitable sulfonates for use in the molding compositions are the alkyl- and alkylbenzenesulfonates the alkyl groups of which have a chain length of from 4 to 30 carbon atoms. Alkylsulfonates with a chain length of 10 to 18 carbon atoms and alkylbenzenesulfonates with a chain length of 8 to 15 carbon atoms are especially suitable. For equal chain lengths the alkylsulfonates give the better antistatic values. In the case of multinuclear or condensed aromatic ring systems such as diphenyl- and naphthalene sulfonates, 1 to 2 methyl, ethyl, propyl or isopropyl groups are sufficient to give optimum effects. The alkali metal salts such as the sodium, potassium and ammonium salts and especially the sodium and potassium salts, and the alkaline earth metal salts, especially the calcium salts and the amine salts such as the alkanol amine salts and especially of triethanolamine are suitable for use. Mixtures of different sulfonates can be used. For example alkylsulfonates having the above mentioned alkyl group chain lengths together with potassium or calcium salts of tetrapropylenebenzenesulfonate or n-dodecylbenzenesulfonate or a mono- or dimethylnaphthalenesulfonate are suitable.

Normal types of polystyrenes produced by block or suspension polymerization and shock resistant types such as butadiene containing copolymers and graft polymers and styrene-acrylonitrile copolymers and acrylonitrilebutadiene-styrene graft and copolymers are suitable for use. The styrene can be wholly or partly substituted by substituted styrenes such as α-methylstyrene. Polystyrenes produced by suspension and block polymerizations as well as the shock resistant butadiene containing co- and graft polymerizates are especially suitable. The polymer may contain the usual additions such as coloring materials, fillers, lubricants and/or leavening agents and antioxidants if necessary especially in the case of butadiene containing polymers.

The incorporation of the sulfonate is accomplished generally by mixing with the powder, pearl or granular form of the polymer by means of mixing rolls thereby producing a so-called mill granulate. The mixing may be carried out with an addition of an aqueous or methanolic sulfonate solution. The solvent is removed by evaporation and the resulting mixture is granulated e.g. by means of an extruder.

The antistatic molding compositions produced as described above may be worked at temperatures in the range from 160 to 270° C. which are also applicable for untreated compositions.

The antistatic molding compositions were tested by the Staub test method by measurement of the surface resistance according to DIN 53482–VDE 0303 part 3 and by indications of the fading of the charge obtained by the use of rotating field strength measuring apparatus according to Professor Schwenkhagen (see M. Bühler "Textilpraxis" 12/11, page 1147 (1957)). The measurements were made on 1 mm. thick square molded pieces with an edge length of 150 mm.

The Staub test was carried out as follows.

A test plate after being rubbed with a wool cloth was held over crushed cigar or cigarette ashes. The test was considered to be positive when the test piece was held 1 cm. from the ashes and no particles of the ashes were attracted to the test piece. Since the humidity of the air strongly influences the electrostatic charging, all measurements unless otherwise specified, were made at 20° C. and 65% relative humidity. The test results are shown in the following table.

The table shows test results for:

(I) Polystyrene (suspension or block polymerization), copolymers of styrene and acrylonitrile containing from 20 to 30% by weight of the acrylonitrile and copolymers of styrene with α-methylstyrene containing from 10 to 20% by weight of the α-methylstyrene. The molecular weight of the samples was within the range from 100,000 to 200,000.

(II) Shock resistant polystyrene having a butadiene content of 10% by weight, the length of an extruded spiral being used as a measure of the fluidity. The spiral length of the polymers used at 180° C. was 80–100 cm.

(III) Acrylonitrile-butadiene-styrene graft polymers containing 18 to 27% by weight of butadiene and 20 to 25% by weight of acrylonitrile. The spiral length of spirals produced under the same machine conditions was 80–100 cm. at an extrusion temperature of 210° C.

A sodium alkylsulfonate mixture the alkyl groups of which had an average chain length of 15 carbon atoms was used as the sulfonate in the tests.

weight percentage of antistatic agent "b" in the mixture being from 2 to 4% in the case of a mixture for injection and extrusion molding and from 3 to 6% in the case of a mixture for press molding.

TABLE

| Molding Method | Polymer | Parts of sulfonate per 100 parts of polymer | Surface Resistance [1] | Decay of Charge at 23° C. and 50% rel. humidity [2] | Staub test | Observations |
|---|---|---|---|---|---|---|
| Press plates | I | (a) 0 | >10$^{13}$ | Slow | − | |
| Do | I | (b) 2.5 | 10$^{11}$ | do | − | (b) Homogeneous but not antistatic. |
| Do | I | (c) 5 | 10$^8$ | Fast | + | (c) Homogeneous and antistatic. |
| Do | II | (a) 0 | >10$^{13}$ | Slow | − | |
| Do | II | (b) 2.5 | 5.10$^{10}$ | do | − | (b) Homogeneous but not antistatic. |
| Do | II | (c) 5 | 10$^8$ | Fast | + | (c) Homogeneous and antistatic. |
| Do | III | (a) 0 | >10$^{13}$ | Slow | − | |
| Do | III | (b) 2.5 | 10$^{12}$ | do | − | (b) Homogeneous but not antistatic. |
| Do | III | (c) 5 | 5.10$^9$ | Fast | + | (c) Homogeneous and antistatic. |
| Injection Moldings | I | (a) 0 | >10$^{13}$ | Slow | − | |
| Do | I | (b) 2.5 | 5.10$^8$ | Fast | + | (b) Homogeneous and antistatic. |
| Do | I | (c) 5 | 5.10$^8$ | do | + | (c) Strata formation but no further antistatic advantage compared to (b). |
| Do | II | (a) 0 | >10$^{13}$ | Slow | − | |
| Do | II | (b) 2.5 | 5.10$^7$ | Fast | + | (b) Homogeneous and antistatic. |
| Do | II | (c) 5 | 5.10$^7$ | do | + | (c) Strata formation but no further antistatic advantage compared to (b). |
| Do | III | (a) 0 | >10$^{13}$ | Slow | − | |
| Do | III | (b) 2.5 | 10$^9$ | Fast | + | (b) Homogeneous and antistatic. |
| Do | III | (c) 5 | 10$^9$ | do | − | (c) Strata formation but no further antistatic advantage compared to (b). |
| Extruded Body | I | (a) 0 | >10$^{13}$ | Slow | − | |
| Do | I | (b) 2.5 | 10$^8$ | Fast | + | (b) Homogeneous and antistatic. |
| Do | I | (c) 5 | | | | (c) Not extrudable. |
| Do | II | (a) 0 | >10$^{13}$ | Slow | − | |
| Do | II | (b) 2.5 | 10$^8$ | Fast | + | (b) Homogeneous and antistatic. |
| Do | II | (c) 5 | | | | (c) Not extrudable. |
| Do | III | (a) 0 | >10$^{13}$ | Slow | − | |
| Do | III | (b) 2.5 | 10$^8$ | Fast | + | (b) Homogeneous and antistatic. |
| Do | III | (c) 5 | | | | (c) Not extrudable. |

[1] Average of 5 measurements.
[2] Slow=half life period reached only after 4 and more minutes. Fast=half life period amounted to only a few seconds with a 4 to 8 fold reduced charging.

We claim:
1. An antistatic molding composition for injection and extrusion and press molding said composition being a homogeneous mixture consisting of polymer components "a" and antistatic agent "b," in which component "a" is a copolymer of styrene and a member selected from the group consisting of acrylonitrile and α-methylstyrene, said member being present in the copolymer in an amount of from 20 to 30% by weight in the case of acrylonitrile and in an amount of from 10 to 20% by weight in the case of α-methylstyrene, and component "b" is a sodium alkylsulfonate mixture the alkyl groups of which have an average chain length of 15 carbon atoms, the

References Cited

UNITED STATES PATENTS

| | | | |
|---|---|---|---|
| 3,025,257 | 3/1962 | Coler et al. | 260—93.5 |
| 611,661 | 6/1962 | Hoechst | 260—93.5 |
| 2,579,375 | 12/1951 | Eisen | 260—324 |
| 2,729,860 | 1/1956 | Balkin et al. | 19—143 |
| 2,978,440 | 4/1961 | Frissell et al. | 260—87.1 |

FOREIGN PATENTS 781,171  8/1957  Great Britain.

MURRAY TILLMAN, *Primary Examiner.*

GEORGE F. LESMES, *Examiner.*

J. T. GOOLKASIAN, *Assistant Examiner.*